United States Patent

Noble

[15] 3,695,140

[45] Oct. 3, 1972

[54] COTTERING DEVICE

[72] Inventor: Robert L. Noble, Costa Mesa, Calif.

[73] Assignee: Fowler Knobbe & Martens, Orange, Calif.

[22] Filed: March 23, 1970

[21] Appl. No.: 21,838

[52] U.S. Cl. .......................................................85/8.3

[51] Int. Cl. ...............................................F16b 21/14

[58] Field of Search..........85/8.3, 5 CP, 8.9; 151/5, 6

[56] References Cited

UNITED STATES PATENTS

| | | | |
|---|---|---|---|
| 1,107,881 | 8/1914 | Berntsen | 85/5 CP |
| 2,552,151 | 5/1951 | Cohen | 85/8.3 |
| 3,132,556 | 5/1964 | Doering et al. | 85/5 CP |

FOREIGN PATENTS OR APPLICATIONS

| | | | |
|---|---|---|---|
| 487,623 | 4/1918 | France | 85/8.3 |
| 1,348,440 | 12/1963 | France | 85/8.3 |
| 45,221 | 3/1915 | Sweden | 85/8.3 |

*Primary Examiner*—Edward C. Allen
*Attorney*—Fowler, Knobbe & Martens

[57] ABSTRACT

A cottering device for securing elements on a shaft made of a single length of resilient material formed to a circular shape with a diametrical straight portion extending from one extremity of the circular portion and intersecting the circular portion at a point on the periphery opposite the extremity essentially on the line of the diameter of the circle. Provision is made for rendering the device unsusceptible to being dislodged by vibration or pressure from the elements secured by the device, without the need for permanent bending of the device to lock it in place.

3 Claims, 8 Drawing Figures

32
34
14
26
16
30
28
22

INVENTOR.
ROBERT L. NOBLE

BY
FOWLER, KNOBBE
& MARTENS
ATTORNEYS.

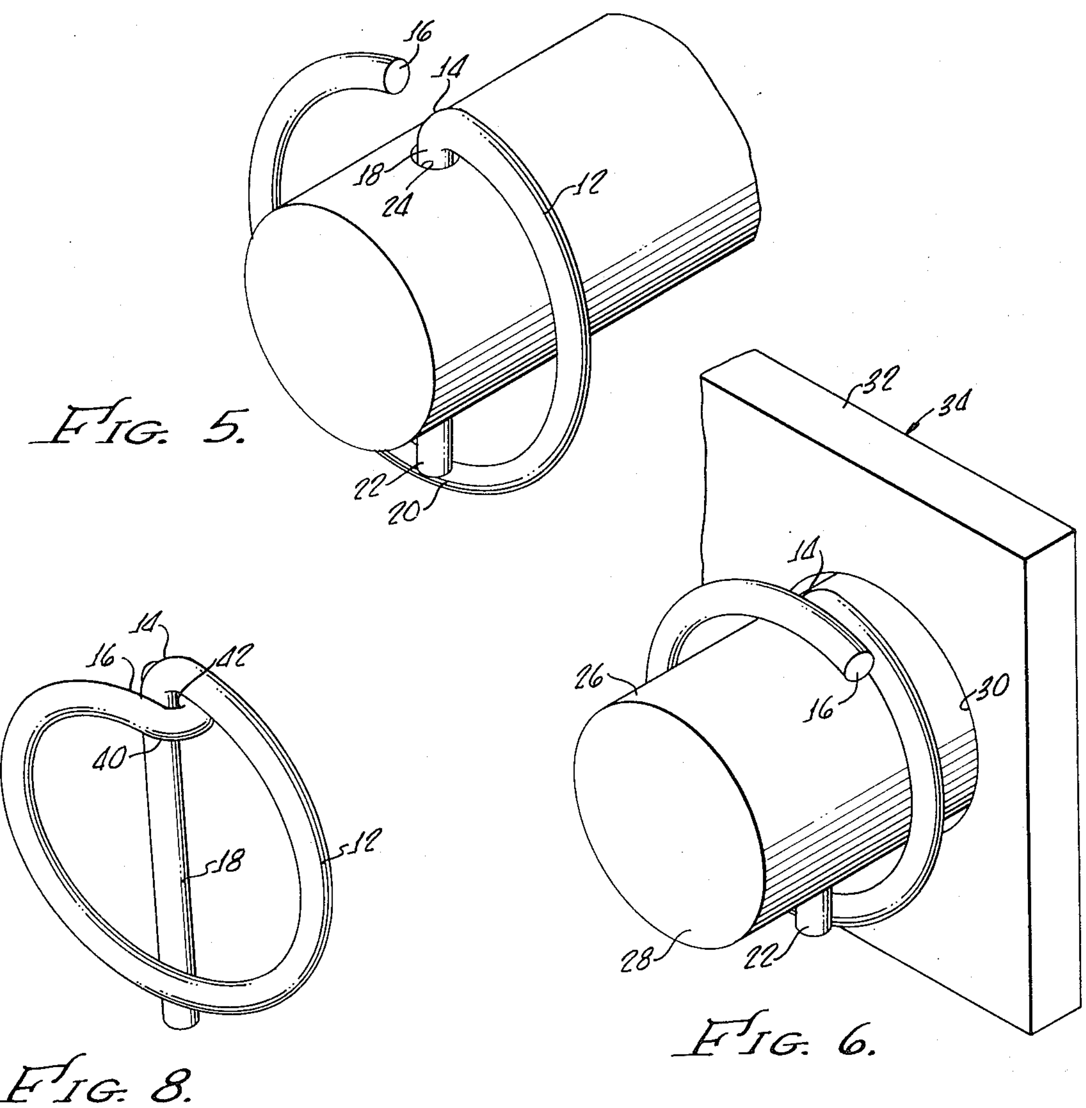
FIG. 5.
FIG. 6.
FIG. 8.
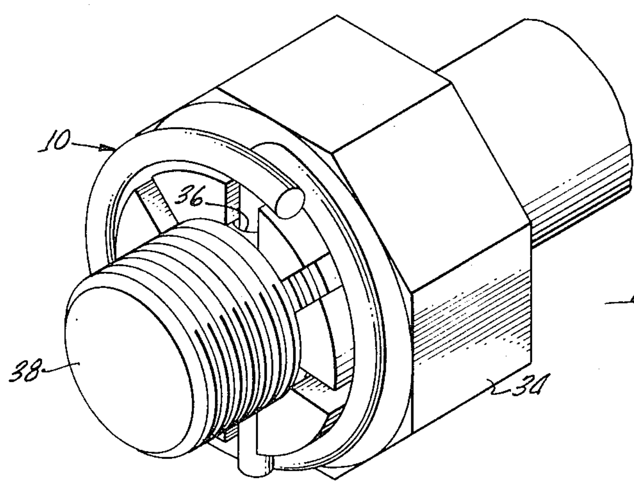
FIG. 7.
INVENTOR.
ROBERT L. NOBLE
BY
FOWLER, KNOBBE
& MARTENS
ATTORNEYS.

COTTERING DEVICE

BACKGROUND OF THE INVENTION

This invention relates to cottering devices which are inserted through a hole in a shaft or bolt in order to prevent wheels, arms, etc. from vibrating or being dislodged therefrom, or to prevent nuts from vibrating loose from bolts on which said nuts are threaded.

It has been customary in the prior art to use a locking device such as a common cotter key which may be inserted through a hole running through the diameter of the shaft. However, these devices customarily required a permanent bending operation to prevent their being dislodged, or if not permanently bent have been susceptible to being dislodged by pressure or vibration from the elements which they secure. Permanent bending of such devices requires malleable material which material typically does not have high shear strength. In addition, this bending operation causes fatigue in the devices and limits their useful life. The prior devices which have overcome these deficiencies have required complex combinations of springs, pins and wires in order to assure proper locking.

SUMMARY OF THE INVENTION

The preferred embodiment of the present invention, on the other hand, is simply constructed and self-locking to prevent its being dislodged by pressure from the devices it secures. The cottering device is formed of a single elongated member of resilient material shaped into an essentially full circle ring, one extremity of said ring continuing diametrically across the face of said ring to a point just opposite said extremity and extending a small distance beyond the ring at said point. The flexibility of this device allows its insertion without permanent bending of the device. The diametrical portion may be inserted into a hole through the diameter of the shaft or bolt on which an arm or nut is to be secured by rotating said ring about an axis tangential to said ring at the point of said extremity, and thereby displacing said point on said ring from said diametrical member. Once the diametrical member is so inserted the ring portion is allowed to resiliently return to its original position relative the diametrical member. In this position the cottering device is susceptible to being displaced from the secured devices by pressure from said secured devices or vibration. However, provision is made for spreading said ring portion to allow said point on said ring portion to pass over said extending portion of said diametrical member to permanently lock the device on said shaft or bolt.

DESCRIPTION OF THE DRAWINGS

A more complete understanding of the invention may be had by reference to the following detailed description taken in conjunction with the drawing wherein:

FIG. 5 is a perspective view of the cottering device during the spreading of the ring portion which allows said ring portion to pass over the diametrical portion;

FIG. 6 is a perspective view of the cottering device locked in place on the shaft; and FIG. 7 is a perspective view of the cottering device locked in place on a nut threaded onto a bolt.

FIG. 8 is a perspective view of an alternative embodiment of the cottering device.

DETAILED DESCRIPTION OF THE INVENTION

Figure 1:
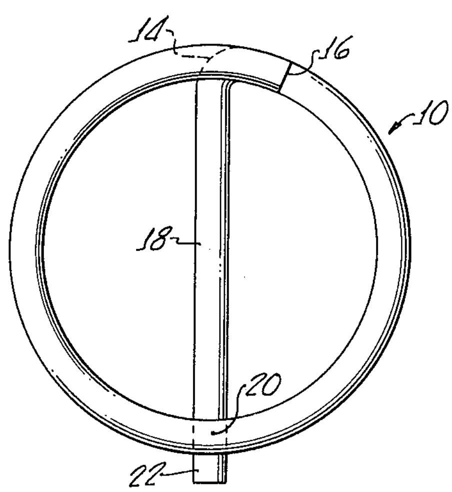
FIG. 1 is a plan view of the cottering device prior to insertion into a shaft or bolt.

Referring now to FIG. 1 there is shown a cottering device 10 comprised of a singular length of resilient material such as spring steel or plastic having a circular cross section throughout its length and molded or bent into a ring portion 12 beginning at one extremity 14 and continuing at least through a 180° arc to a second extremity 16. In the preferred embodiment shown, the circular arc is slightly more than 360° so that the extremities 14 and 16 are contiguous. Additionally while the ring portion 12 forms a circle in the preferred embodiment, said portion 12 could describe the periphery of other geometrical surfaces. The device 10 continues through the extremity 16 to form a substantially right angle bend terminating in a straight diametrical portion 18 which depends from the ring portion 12. The ring portion 12 intercepts the diametrical portion 18 at a point 20 so that the diametrical portion 18 forms an extension or free end portion 22 beyond the periphery of the ring portion 12 at the point 20 in order to provide the locking feature. The extension 22 must be long enough to extend beyond the ring portion at point 20, but sufficiently short to allow the diameter of the ring portion to be expanded to pass over the extension 22 as explained below.

While the ring portion may continue through any desired arc, so long as it extends at least once beyond the point 20, preferably the completed ring portion 12 will end at the extremity 16 near the extremity 14, as shown in the drawings.

Referring now to FIGS. 2 through 6 the method for using the device of FIG. 1 will be explained.

Figure 2:
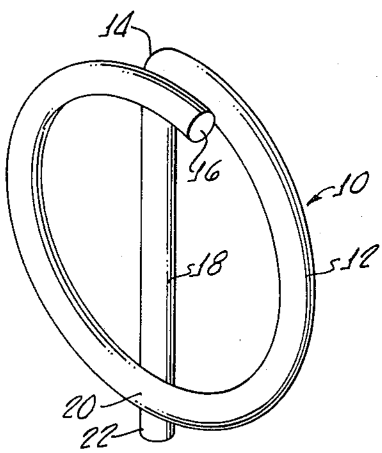
FIG. 2 is a perspective view of the device as shown in FIG. 1.

In FIG. 2 it can be seen that prior to use the diametrical portion 18 of the cottering device lies essentially on the same plane as the ring portion 12 and due to the resilience of the material is firmly abutted thereto at point 20.

Figure 3:
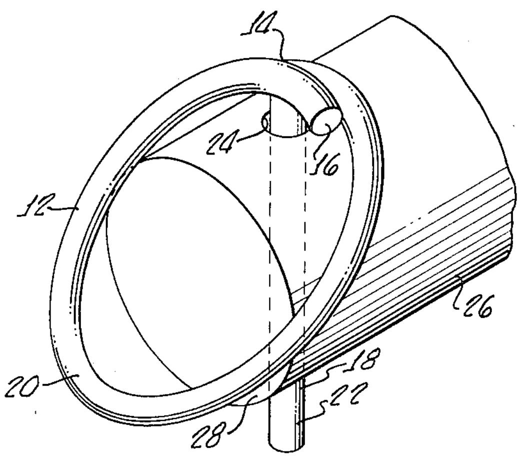
FIG. 3 is a perspective view of the cottering device during the insertion of the diametrical portion into a shaft.
Figure 4:
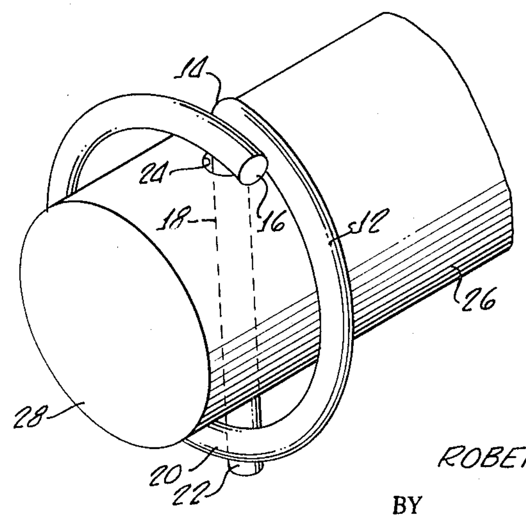
FIG. 4 is a perspective view of the cottering device after insertion into the shaft but prior to locking.

As shown in FIG. 3 in order to make insertion of the diametrical portion 18 into a hole 24 in a shaft 26, it is necessary to rotate the ring portion 12 about an axis tangential to the ring 12 at extremity 14. This is accomplished by torsionally flexing of the ring portion in the vicinity of the extremity 14 to clear the end 28 of the shaft 26. This is typically done as shown in FIG. 3 by first inserting the extension 22 of the diametrical portion 18 into the hole 24 and applying an upward pressure to the ring portion in the area of the point 20 to pull point 20 away from the extremity 22 at the same time applying an appropriate force to pass the diametrical portion 18 through the hole 24.

Once the diametrical portion 18 has been inserted, the ring portion is released as shown in FIG. 4 and will again return to its normal configuration.

However, to insure proper locking of the device 10 on the shaft 26 the ring portion 12 must be snapped over the extension 22 of the diametrical portion 18 so that the ring portion 12 at point 20 resides behind the extension 22, when viewed from the end 28 of the shaft 26. This may be done as follows:

Referring to FIG. 5, the diameter of the ring portion 12 is expanded by spreading the extremity 16 away from the extremity 14 in a tangential direction so that the point 20 on the ring portion 12 is moved radially to clear the extremity 22. The ring portion 12 is then allowed to contract while the circular portion at point 20 is positioned behind extremity 22 as shown in FIG. 6, so that all of the circular portion 12 at point 20 lies between the axis of the diametrical portion 18 and the rod 32.

Since the ring portion 12 of the device 10, in the inserted and locked condition shown in FIG. 6, is displaced from its normal configuration shown in FIGS. 1 and 2, the resilience of the material maintains a tight fit between the diametrical portion 18 and the ring portion 12 at point 20.

The usefulness of this device is best explained by reference to FIG. 6. The shaft 26 passes through a suitable hole 30 in a rod 32. The purpose of the device is to prohibit the rod 32 from being forced off the end 28 of the shaft 26. If a force is applied as shown by the arrow 34 against the rod 32, the rod 32 cannot lift the ring portion 12 at point 20 to allow the diametrical portion 18 to withdraw from the shaft 26, since the extension 22 is interposed between the ring portion 12 at point 20 and the end 28 of the shaft 26. Without the locking feature, any irregularity of the rod 32, or dirt thereon, could rotate the ring portion 12 to the position shown in FIG. 3, allowing the device to leave the shaft 26.

As shown in FIG. 7, the cottering device is also advantageously used to prohibit relative rotation between nuts and bolts which are threaded together. In this embodiment the ring portion 12 is made sufficiently large to encircle the nut, which is shown as a castellated nut 34. The diametrical portion 18 is placed between the castellations of the nut 34, and passes through a hole 36 in the bolt 38. The locking feature is identical to that explained above.

FIG. 8 shows an alternate embodiment of the present invention in which the extremity 16 of the circular portion 12 is formed in a 180° bend 40 so that the extremity 16 returns upon itself leaving a space 42 within the bend 40. The circular portion 12 of this embodiment may be flexed so that the diametrical portion 18 near the extremity 14 of the circular portion 12 is placed within the space 42 after the device is inserted into a shaft, thereby attaching the extremity 16 to the diametrical portion 18. This attaching or hooking of the diametrical portion 18 with the extremity 16 of the circular portion 12 provides an added safety feature to assure that the circular portion 12 may not be inadvertently expanded to allow accidental removal of the device from the shaft.

The device shown in FIG. 8 is applied in the same manner as the device shown in FIGS. 1 through 6, except that, after insertion, the extremity 16 is hooked around the diametrical portion 18 to further secure the device in position.

What is claimed is:

1. An apparatus for securing elements on bored shafts comprising:
- a shaft having a bore therethrough adjacent one end of said shaft; and
- a cottering device, formed from a single length of resilient material, comprising:
  - a portion formed to describe the periphery of a geometrical surface and capable of circumscribing said shaft;
  - a unitary straight portion extending from one extremity of said geometrical portion, intersecting with and extending past said geometrical portion at a point on the periphery of said geometrical portion opposite said one extremity, and terminating in a free end portion;
  - means for allowing said geometrical portion to pass over said one end of said shaft during insertion of said unitary straight portion into said bore; and
  - means for allowing said geometrical portion to pass from one side of said free end portion of said unitary straight portion entirely to the opposite side of said free end portion after said unitary straight portion is inserted through the bore of said shaft, for locking said cottering device on said bored shaft with said geometrical portion interposed between said free end portion and the elements to be secured, said means comprising, in combination, the resilience of said geometrical portion and the shortness of said diametrical portion, said resilience returning said geometrical portion to a circumscribing relationship with said bored shaft after said geometrical portion has passed to said opposite side of said free end portion.

2. An apparatus as defined in claim 1 wherein said portion formed to describe the periphery of a geometrical surface circumscribes a 360° arc of said bored shaft.

3. An apparatus as defined in claim 2 additionally comprising:
- means secured to the other extremity of said geometrical portion for removably attaching said other extremity to said unitary straight portion near said one extremity of said geometrical portion to prohibit said geometrical portion for inadvertently passing over said straight portion.

* * * * *